United States Patent [19]
Vanden Heuvel et al.

[11] Patent Number: 6,073,012
[45] Date of Patent: Jun. 6, 2000

[54] SYSTEM FOR DEFINING AN INDIVIDUAL SUBSCRIBER UNIT LOCATION WITHIN A WIRELESS COMMUNICATION SYSTEM AND METHOD THEREFOR

[75] Inventors: Dean Paul Vanden Heuvel, Chandler; Johanna Alexandra Wild, Scottsdale; Scott David Blanchard, Mesa, all of Ariz.

[73] Assignee: Motorola, Inc., Schaumburg, Ill.

[21] Appl. No.: 08/963,626

[22] Filed: Oct. 4, 1997

[51] Int. Cl.[7] ........................................... H04Q 7/38

[52] U.S. Cl. .................. 455/427; 455/429; 455/433; 455/406; 455/456

[58] Field of Search ...................... 455/12.1, 13.1, 455/406, 418, 433, 456, 427, 430, 407, 408, 446, 449, 429; 342/357

[56] References Cited

U.S. PATENT DOCUMENTS

| | | | |
|---|---|---|---|
| 5,546,445 | 8/1996 | Dennison et al. | 455/408 |
| 5,586,167 | 12/1996 | Handforth | 455/456 |
| 5,629,707 | 5/1997 | Heuvel et al. | 455/12.1 |

*Primary Examiner*—Nguyen Vo
*Assistant Examiner*—Lester G. Kincaid
*Attorney, Agent, or Firm*—Sherry J. Whitney; Gregory J. Gorrie

[57] ABSTRACT

A method for assigning a system location to an ISU (32) residing in a wireless communication system coverage area (20) that has a plurality of billing territories (40). Base points (42) are defined to be proximate the billing territories (40) such that each of the base points (42) provides a system location for a corresponding billing territory (40). Each of the billing territories (40) has a plurality of reference points (44) distributed therein in accordance with a geographic independent algorithm such that each of the reference points (44) is described by an offset from the corresponding base point (42) of the corresponding billing territory (40). By obtaining an actual location (54) of the ISU (32) and identifying one of the reference points (44) closest to the actual location (54), the ISU (32) is assigned the system location of the identified reference point (44). In a preferred embodiment, the method and apparatus of the present invention are used in a mobile satellite system (19).

12 Claims, 5 Drawing Sheets

SYSTEM FOR DEFINING AN INDIVIDUAL SUBSCRIBER UNIT LOCATION WITHIN A WIRELESS COMMUNICATION SYSTEM AND METHOD THEREFOR

FIELD OF THE INVENTION

The present invention relates generally to a wireless communication system. More specifically, the present invention relates to defining an individual subscriber unit location within a wireless communication system.

BACKGROUND OF THE INVENTION

Modern wireless communication systems or networks, such as GSM (Global System for Mobile Communications) and IRIDIUM, determine an Individual Subscriber Unit (ISU) location and use that information for billing and accessing purposes. Knowledge of the location of the ISU allows the network to route ring-alert page messages, incoming calls, and other communications to the ISU. In addition, this location information allows the network to conform to diverse rules and procedures which may be imposed by political entities within whose jurisdiction the network may operate. Typically, an ISU is located on a map of a coverage area of the communication system. An explanation of location references and conventional techniques used to map the coverage area is presented below.

A typical technique for mapping a coverage area subdivides each Gateway (GW) or mobile telephone switching office (MTSO) area into Service Control Areas (SCAs) or billing territories which are further subdivided into Location Area Codes or LACs. The SCA or billing territory represents a region throughout which access rules and billing rules are consistent. Each SCA or billing territory is wholly contained within a single GW or MTSO area and is a subdivision of that GW area. The LAC represents a smaller region, completely contained within the SCA. This smaller division is utilized by the system as a system location reference for an ISU and is used by the system to label the location of the ISU.

This SCA/LAC subdivision of the system coverage area map is represented in a database form, and distributed to each GW area for use. A conventional SCA/LAC database contains data to effectively tile the entire system coverage area with tiles of varying sizes such that each tile is identified by its GW/SCA/LAC affiliation. Boundaries defining SCA/LAC subdivisions are typically defined politically and geographically, not mathematically. Accordingly, generation, distribution and maintenance of the database defining these political and geographic boundaries is a substantial task. For the IRIDIUM system, each GW area has an Earth Terminal Controller (ETC) that stores this GW/SCA/LAC database which is unique for each GW area. GSM systems have a similar controller, but the LAC areas are defined by permanent cell site locations and need not be mapped. Simple cell site identities serve as system locations for ISUs. Moreover, when a particular GW area has system problems, transferring this large GW/SCA/LAC database to another GW area, to serve in a backup role, is a large task that takes a substantial amount of system overhead to complete, causing the system to suffer an extensive down time.

To locate an ISU, in the IRIDIUM system for example, a high resolution location known as a grid code or point location is determined. This actual location of the ISU or single-point grid code is compared to the GW/SCA/LAC database to determine the LAC in which the user is currently located. While this high resolution grid code is returned to the ISU, only the compromised LAC location is stored within a Visiting Location Register (VLR) to represent the users location. This LAC location is considered compromised in that it identifies a geographic area or LAC in which the ISU is located in contrast to the available high resolution grid code that gives a specific point location for the ISU. The VLR is a database that is used by a cellular switching office of that GW area to temporarily store data for the subscriber while the subscriber visits an area serviced by that VLR. The VLR provides subscriber location information to a Home Location Register (HLR) for routing calls to the subscriber. The HLR is a database, that is also used by the switching office, in which data on the subscriber is permanently stored. The compromised data stored in the VLR is of little use for subsequent processing and is not suitable for system performance/usage modeling that could be used to perform resource allocation.

Additionally, this compromised location information results in an inefficient use of ring-alert resources due to a need to ring the entire LAC area or several LAC areas rather than a more confined region. Broadcasting each ring-alert page message within a particular LAC requires a certain amount of energy. In terrestrial wireless (e.g., cellular) systems, there is less need to conserve energy because the energy supply is virtually unlimited. However, energy limitations are not the only concerns, as terrestrial wireless systems do have capacity limitations. In a satellite communication system, where subscriber units receive ring-alerts from satellite communication nodes, it is desirable to conserve both energy and capacity by only broadcasting ring-alerts in as few LACs as possible, since a satellite's energy supply is limited to that supplied by its solar panels and its batteries. Further, system capacity will limit broadcasting opportunities in both satellite and terrestrial systems. Energy expended and opportunities consumed for ring-alerts reduces the amount of energy and capacity available for other communications.

Accordingly, a need exits for a method of defining an ISU location in a wireless communication system that provides high resolution location data while minimizing the database used to map the coverage area therein.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

In a preferred embodiment of the method and apparatus of the present invention, improved individual subscriber unit (ISU) location determination capabilities are provided within a mobile satellite communication system. In addition, a preferred embodiment of the present invention provides a method and apparatus for maintaining the ISU location information for usage by various system functions such as, for example, billing, ring-alert, resource management, and emergency location identification.

Figure 1:
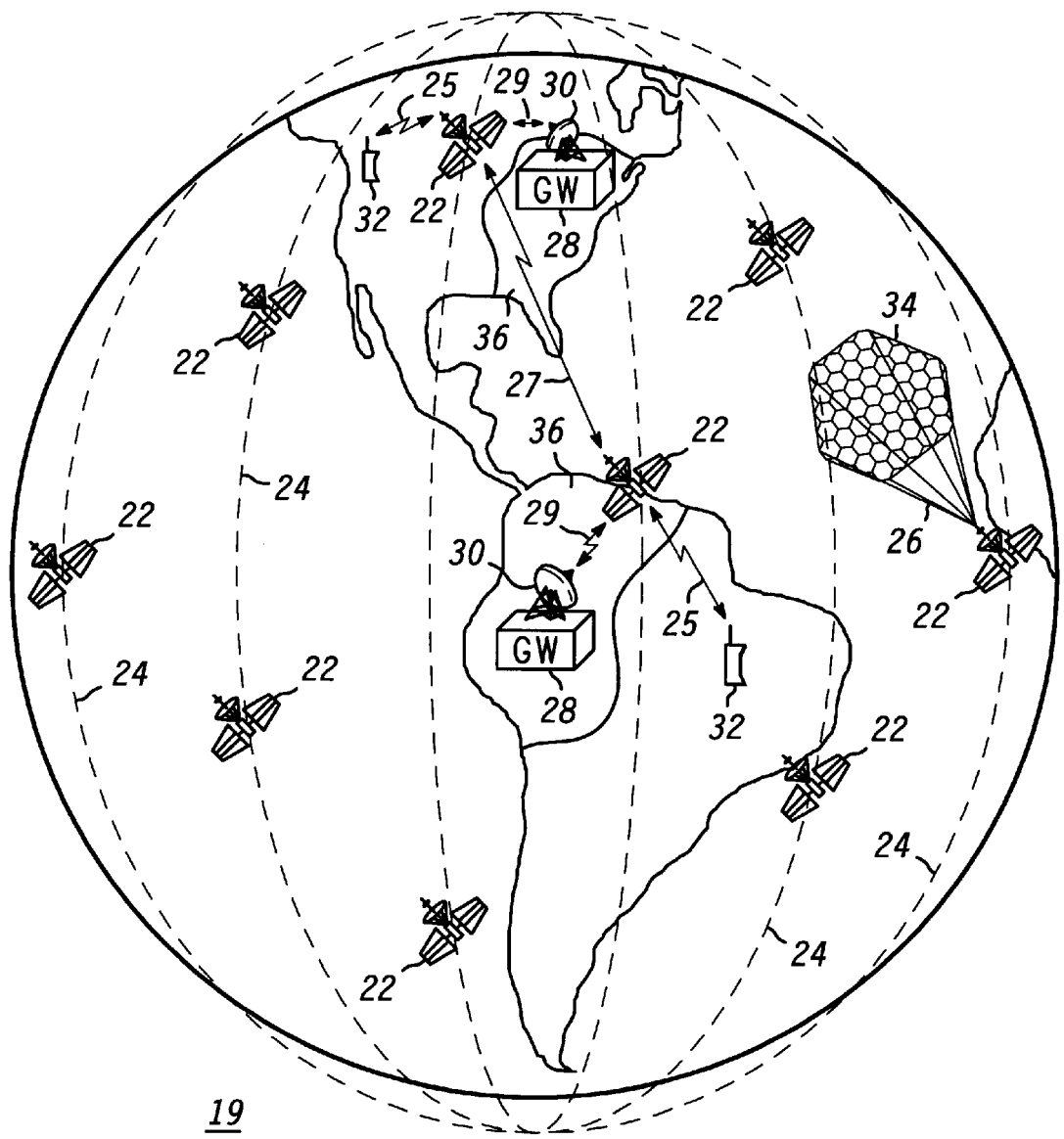
FIG. 1 shows a diagram of a wireless communication system/network coverage area with satellites in non-stationary orbits in accordance with a preferred embodiment of the present invention.

FIG. 1 shows a diagram of a wireless communication system/network 19 having a coverage area 20 that includes the entire surface of the earth. Communication system 19 is shown having a plurality of satellites 22 placed in non-geostationary orbits 24. Each of satellites 22 projects RF communication beams 26 toward the surface of the earth and is capable of communicating with a Gateways (GW) 28 (two shown) over links 29. GW 28 represents associated hardware of communication system 19 that is used to provide communication services for an associated GW area 36 (two shown). Communication beams 26 are used to carry system information, such as ring-alert page messages, as well as voice communication channels. Each GW 28 communicates with satellites 22 using a receiver/transmitter or transceiver 30 (two shown).

Individual Subscriber Units (32) (ISUs) can be, for example, cellular telephones, pagers, facsimile devices, or other data sources or destinations which are capable of interfacing with satellites 22 over links 25 which are provided within beams 26. ISUs 32 can communicate with each other through one or more satellites 22 of the system 19. FIG. 1 illustrates only an exemplary communication link between two ISUs 32. The second ISU 32 of FIG. 1 could be replaced with a GW 28 and any of a variety of other telephonic devices connected to a Public Switched Telecommunications Network or PSTN (not shown). Moreover, each of satellites 22 projects a footprint pattern of cells 34 (one shown) resulting from multiple signal beams 26. Each cell 34 or beam 26 has a signal beam identity that is known and used by communication system 19. In a preferred embodiment, each cell 34 from each satellite 22, moves relative to the earth as satellites 22 travel in their non-geostationary orbits 24. In alternate embodiments, cells 34 could be essentially fixed with respect to the surface of the earth. In a preferred embodiment, satellites 22 communicate with each other over satellite crosslinks 27. Thus, a signal from GW 28 can be sent to ISU 32 via links 29, 27, and 25.

Figure 2:
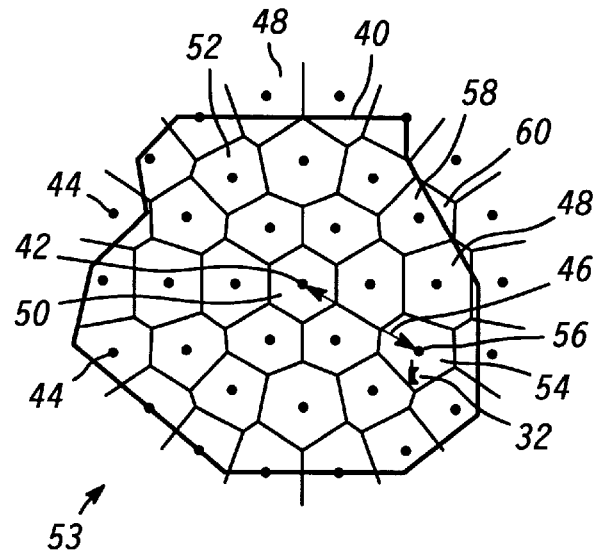
FIG. 2 shows a diagram of a geographic independent overlay mapping scheme of an exemplary billing territory in accordance with a preferred embodiment of the present invention.

FIG. 2 shows a diagram of a geographic independent overlay mapping scheme 53 used in connection with an exemplary billing territory 40. Each GW area 36 in coverage area 20 (FIG. 1) contains at least one billing territory 40, creating a plurality of billing territories 40 in coverage area 20 (FIG. 1). Billing territories 40 remain substantially stationary relative to the surface of the earth. Cells 34 of satellites 22 move relative to the earth's surface or coverage area 20 (see FIG. 1), passing over the substantial stationary billing territories 40 (FIG. 2) that correspond to geographic areas of wireless communication system 19 (FIG. 1). Billing territory 40 is shown in FIG. 2 having a shape that is defined by a perimeter of that exemplary billing territory wherein the billing territory perimeter defines geopolitical and geographic boundaries as determined by wireless communication system 19 (FIG. 1).

The present invention defines a base point or registration point 42 (FIG. 2) for each billing territory 40. Base points 42 are used by system 19 to reference and locate billing territories. That is, one base point 42 references and locates one billing territory 40. For this embodiment, base point 42 is located approximately at a center of billing territory 40. However, base point 42 could be located anywhere proximate billing territory 40 just as well. A plurality of reference points 44 are distributed throughout billing territory 40, using a geographic independent scheme so as to map billing territory 40. This mapping of billing territory 40 uses reference points 44 to identify locations within billing territory 40 rather than geographic or geopolitical boundaries conventionally used for location identification. Each reference point 44 is described by the system using an offset 46. Offset 46 represents a vector that extends from base point 42 to that corresponding reference point 44. The vector for offset 46 can be expressed in polar coordinates or Cartesian coordinates, having base point 42 as an origin. For the embodiment shown, reference points 44 are each at centers of a plurality of approximately regular sized overlay regions 48 that are of similar shapes. In the embodiment shown, reference points 44 are distributed with respect to each other in a regular fashion about base point 42.

Herein, a regular sized region is defined as a closed, two-dimensional geometric figure having sufficient symmetry so that it may be accurately described in both size and location using only a few parameters. For example, the regular sized regions shown may each be accurately reconstructed from parameters which define the center coordinates and a radius. Likewise, a rectangle and various regular polygons may be accurately reconstructed from two parameters which define coordinates for selected vertices. An advantage of the method and apparatus of the present invention is that, because the reference points 44 are distributed in a regular fashion with respect to each other, no need exists for distribution of extensive data describing the shapes of the overlay regions. Rather, any system node or entity can compute the reference point locations.

Other regular sized regions may be used, achieving the same results. In contrast, an irregular shaped region is herein defined to be a closed two-dimensional geometric figure having a generally asymmetrical perimeter and being represented in both size and location by specifying a multiplicity of parameters. For example, billing territory 40 (FIG. 2) is an irregular shaped region since it may be reconstructed from multiple parameters that define numerous line segments which together form a perimeter of territory 40.

For the embodiment shown in FIG. 2, one of regular sized overlay regions 48 is a centered region 50 that has base point 42 as its center. Other overlay regions 48 are arranged to surround centered region 50, forming multiple rings 52 that space outwardly to contain and overlie the entirety of billing territory 40. For this embodiment, regular sized overlay regions 48 have substantially equal areas. Regular sized overlay regions 48 combine to form a common overlay map 53 that is generated in accordance with a geographic independent scheme and is defined for each billing territory 40 of coverage area 20 (FIG. 1). The system uses base point 42 as a registration point to identify and position each common overlay map 53, minimizing data and processing time used to map coverage area 20 (FIG. 1). One ISU 32 is depicted as being located in overlay region 48 and has an actual location 54. A distinct overlay map will be distributed or computed for each irregularly shaped billing territory 40.

Various means may be used to determine actual location 54, such as using Global Positioning System (GPS) satellites to locate active subscriber units and processing Doppler and/or propagation in signals exchanged between satellites 22 and ISUs 32 in a manner known to those skilled in the art. An identified reference point 56 that is closest to actual location 54 is used by system 19 as a high resolution system location for ISU 32 and is stored by system 19 as offset 46 from base point 42. Although this system location is not as high in resolution as actual location 54, the resolution is higher than that achieved by using the conventional LAC identification as the system location for ISU 32. This high resolution system location is significant to satellite communication systems because it minimizes the amount of satellite energy used to send ring-alert page messages by limiting the area covered by the ring-alert. For this embodiment, the ring-alert page message is sent to the regular sized region 48 having identified reference point 56 rather than the entire conventional LAC. Desirably, the actual area for message delivery would contain region 48 expanded to allow for some mobility of the ISU 32. For example, if regular sized region 48 is approximately 10 km in radius and the predefined mobility expansion allowance is 100 km, then the system would send the message to an area of approximately 110 km in radius, centered on identified reference point 56.

Moreover, billing territory 40 has an inside territory 58 (i.e. within the boundary of billing territory 40) and an outside territory 60 (i.e. outside the boundary of billing territory 40). As a result of using regular sized overlay regions 48 to generate common overlay map 53, a portion of overlay regions 48 resides in both inside territory 58 and outside territory 60. Permitting overlay regions 48 to overlap inside territory 58 and outside territory 60 allows common overlay map 53 to contain all of inside territory 58 of billing territory 40 without defining irregular shaped boundaries.

Wireless communication system 19 has multiple GW areas 36 (FIG. 1) that are spaced such that coverage area 20 is the surface of the earth. Each GW area 36 (FIG. 1) contains at least one billing territory 40 (FIG. 2) that is defined by its corresponding overlay map 53. Wireless communication system 19 (FIG. 1) uses common overlay map 53 (FIG. 2) to locate each ISU 32 residing in each billing territory 40 contained by each GW area 36 (FIG. 1). A more detailed description of GW 28 and GW area 36 is given below.

Figure 3:
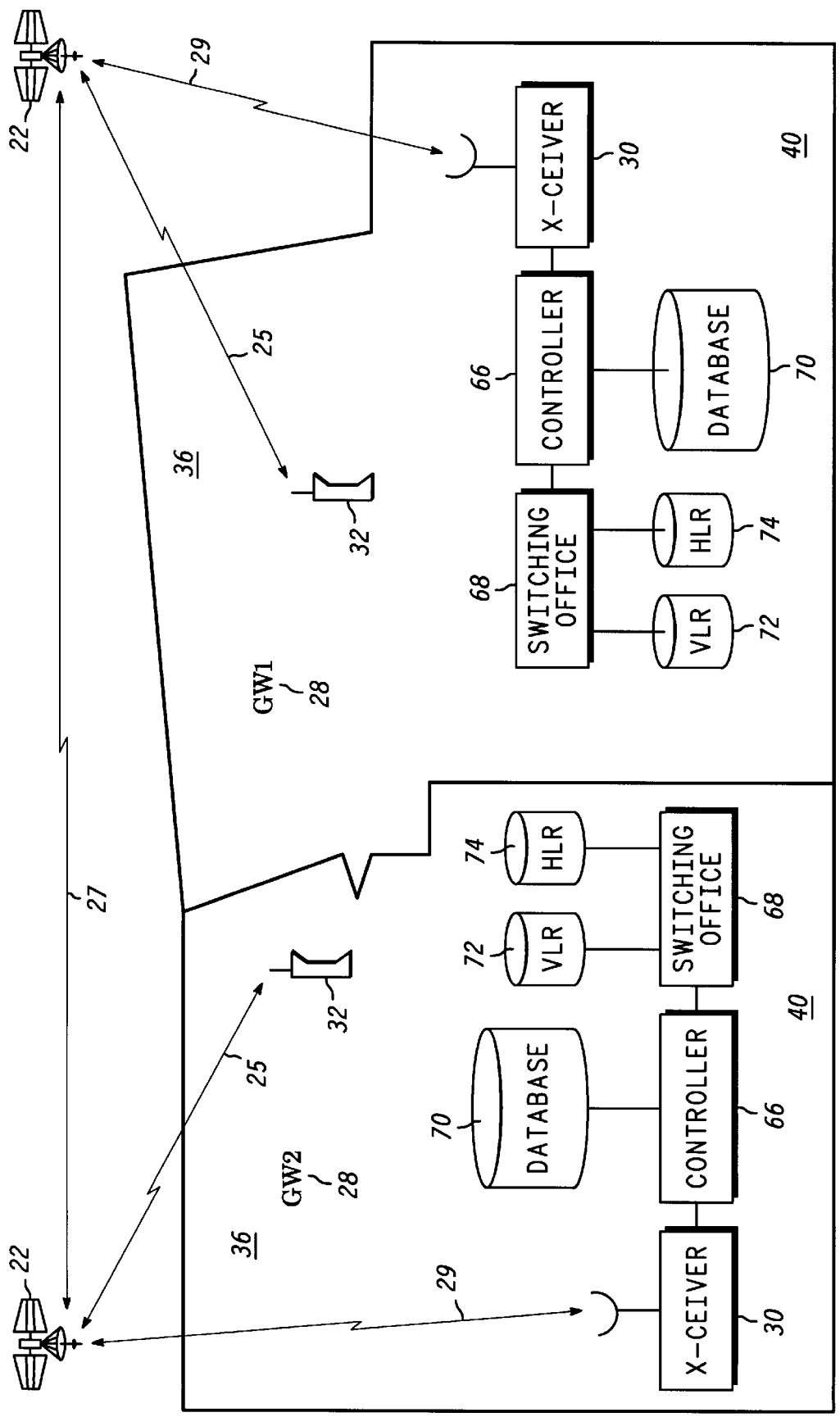
FIG. 3 shows a diagram of a ring-alert system for a wireless communication network in accordance with a preferred embodiment of the present invention.

FIG. 3 shows a diagram of a ring-alert system 62 used by wireless communication system 19. FIG. 3 shows first and second GW areas 36 that are designated as GW 1 and GW 2 respectively. For this embodiment, GW 1 and GW 2 each have their own billing territories such that boundaries of the GW areas correspond to boundaries of the billing territories respectively. GW 1 and GW 2 are shown as each having transceiver 30 coupled to an Earth Terminal Controller (ETC) or controller 66, which is coupled to a cellular switching office 68. Each controller 66 is shown having a database 70 while each switching office 68 is shown having databases of a Visiting Location Register (VLR) 72 and a Home Location Register (HLR) 74. GW 1 and GW 2 each have a single ISU 32 residing therein in the example depicted in FIG. 3 and are shown using RF communication links 40 to provide communication services between the respective subscriber units. Controller 66 in GW 1 uses common overlay map 53 (FIG. 2) of GW 1, which is stored in its database 70, to translate actual locations of its resident ISUs 32 into system reference offsets. Switching office 68 of GW 1 stores these system offsets in its VLR 72 database, while notifying the subscriber units' assigned HLR 74 of a change in location. In a like fashion, controller 66 in GW 2 uses the same common overlay map 53 (FIG. 2) of GW 2, which is stored in its database 70, to translate actual locations of its resident ISUs 32 into system reference offsets. Switching office 68 of GW 2 stores these system reference offsets in its VLR 72 database, while notifying the subscriber units' assigned HLR 74 of a change in location. By using the same common overlay map 53 (FIG. 2) or computation scheme, if GW 1 should need system repairs, GW 2 is available to quickly take over processing responsibilities of GW 1 without transferring database 70 of GW 1 to GW 2. This would reduce network down time and keeping service interruption to subscriber units in GW 1 to a minimum.

Figure 4:
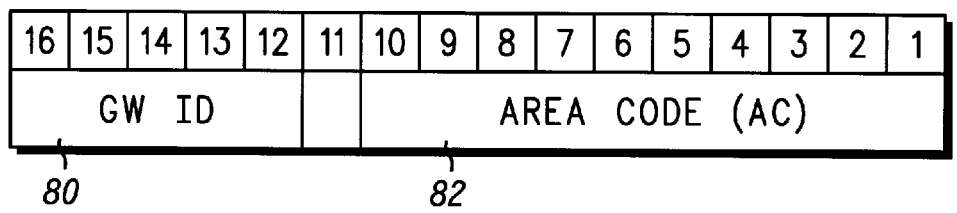
FIG. 4 shows a diagram of a first data element of a visiting location register in accordance with a preferred embodiment of the present invention.
Figure 5:
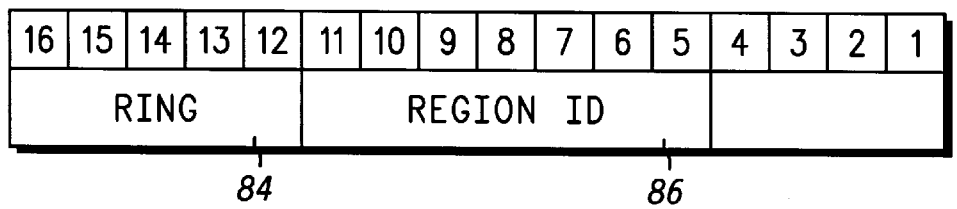
FIG. 5 shows a diagram of a second data element of a visiting location register in accordance with a preferred embodiment of the present invention.

FIGS. 4 and 5 show diagrams of a first data element 76 and a second data element 78 of a VLR 72 in accordance with a preferred embodiment of the present invention. VLR 72 is a database that is used by cellular switching office 68 (FIG. 3) to store a system location for each subscriber unit serviced by and residing in that GW area 36 (FIG. 3) along with other data items. Each subscriber unit residing within jurisdiction of switching office 68 has a first data element 76 and a second data element 78. Data elements 76 and 78 are shown as each having a 16-bit field. First data element 76 uses bits 12 through 16 to store a GW ID 80 data element and bits 1 through 10 to store an Area Code (AC) 82 data element. Second data element 78 uses bits 12 through 16 to store a ring 84 data element and bits 5 through 11 to store a region ID 86 data element. Moreover, GW ID 80 identifies a particular GW area 36 (FIG. 3) while AC 82 contains an identifying code for a base/registration point 42 (FIG. 2) corresponding to billing territory 40 (FIG. 3). For this embodiment, ring 84 identifies the one of multiple rings 52 that contains identified reference point 56 for the subject ISU 32 while region ID 86 stores an angle that locates reference point 56 relative to base point 42 (FIG. 2). First data element 76 records identities of base points and second data element 78 records identities of reference points. Note that for the above embodiment, ring and angle identification of the subject ISU 32 represents the use of a polar coordinate system. These identities may be recorded in Cartesian coordinate form, polar coordinate form, a sequentially numbered scheme, or any other convenient representation. Data bit 11 of first data element 76 and data fields 1 through 4 of second data element 78 are not used by the present invention and are available to be assigned relevant location or other data as required.

Figure 6:
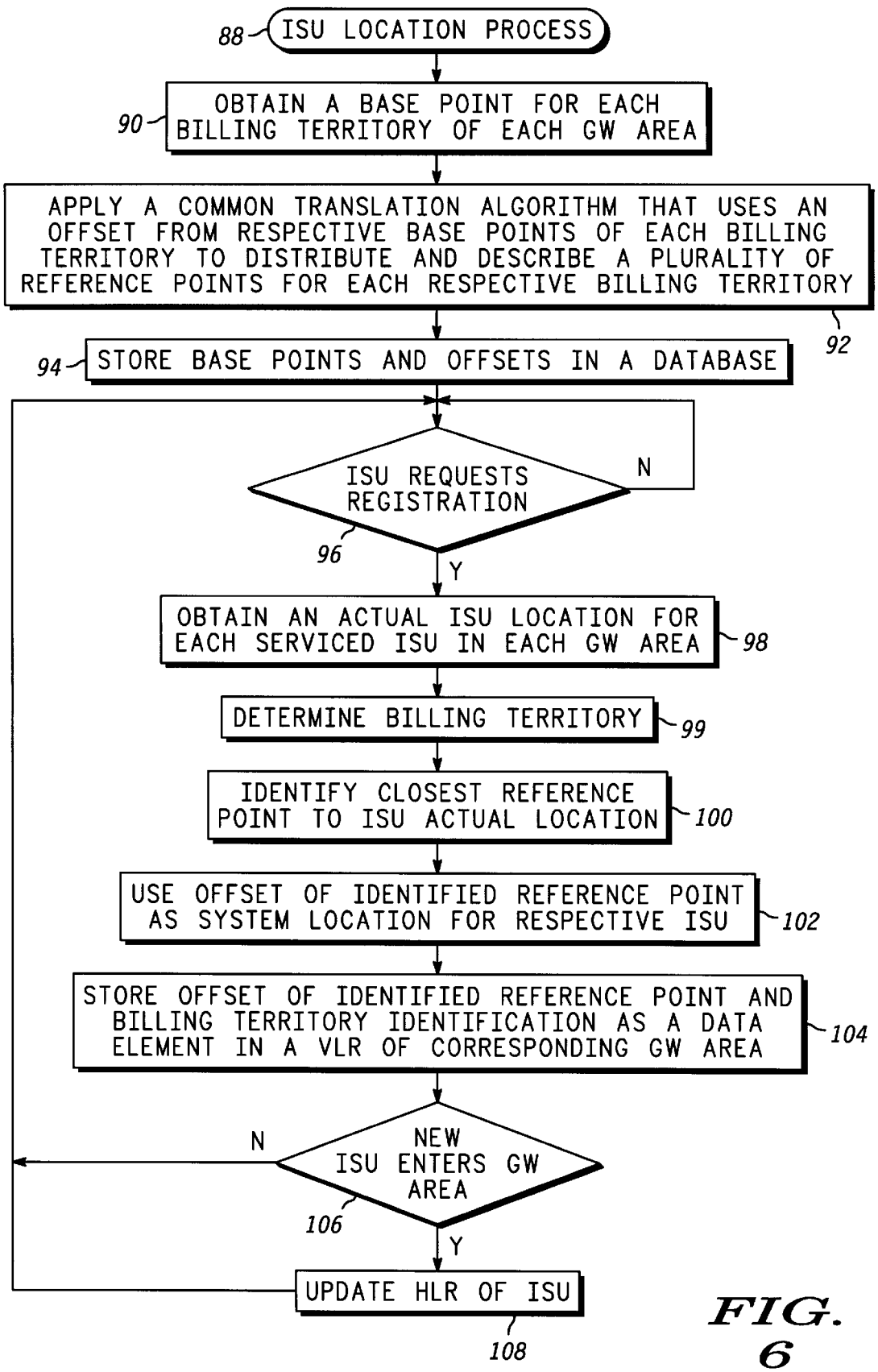
FIG. 6 shows a flowchart of an individual subscriber unit system location process in accordance with a preferred embodiment of the present invention.

FIG. 6 shows a flowchart of an ISU location process 88 that is used in a preferred embodiment of the present invention in assigning a system location to ISU 32 (FIGS. 1–3). Process 88 is performed in a like manner by each controller 66 (FIG. 3) of each GW area 36 of coverage area 20 (FIG. 1). Controller 66 (FIG. 3) starts location process 88 by obtaining base point 42 (FIG. 2) for each billing territory 40 (FIG. 3) in its GW area 36 of coverage area 20 in a task 90. Billing territories 40 (FIG. 3) of each GW area 36 are defined by geographic and geopolitical boundaries that are represented in any of a variety of convenient coordinate forms. Base point 42 (FIG. 2) is used as a system code to uniquely identify each billing territory 40. For this embodiment and the embodiment shown in FIG. 2, base point 42 is located approximately at the center of the billing territory. However, locating base point 42 at other locations proximate billing territory 40 will work just as well. Task 90 may be performed at any convent location in system 19, with the resulting base point 42 converted to an identifying code that is associated with the actual location. For example, an actual location for a base point 42 expressed in latitude and longitude may be associated with an identifier for the billing territory. This identifier or identifying code is used by system 19 as a system location code for billing territories and is shown in FIG. 4 as Area Code (AC) 82 data element.

Following task 90, a task 92 shows controller 66 (FIG. 3) applying a common translation algorithm to distribute and describe a plurality of reference points 44 (FIG. 2) for each billing territory 40 (FIG. 3) of its GW area 36. In this embodiment, the common translation algorithm locates these reference points using a geographic independent scheme to generate a common set of offsets from base point 42 for each respective billing territory 40 (FIG. 2). The referenced geographic independent scheme is used to locate reference points 44 without regard to geographic boundaries and is described by the common translation algorithm. The same common translation algorithm is used by each controller 66 in each GW area 36 (FIG. 3) to generate the common set of offsets that locate reference points 44 (FIG. 2) for its GW area 36 (FIG. 3). It should be noted that reference points 44 and offsets 46 shown in FIG. 2 are located and defined using regular sized regions 48 and are referenced in FIG. 6 for illustrative purposes only. Moreover, a variety of translation algorithms can be written to map billing territory 40 (FIG. 2), accomplishing the same purpose as using regular sized overlay regions 48 to map billing territory 40. One example of a translation algorithm is depicted in FIG. 2 where reference points 44 are distributed in concentric rings around base point 42. Another example could distribute reference points 44 in an array (not shown) of rows and columns with base point 42 being a predetermined point in the array. Task 92 would normally be performed by controller 66 (FIG. 3) during activation of its GW 28 but could be performed or repeated when boundaries of its GW area 36 or billing territories 40 change, for whatever reason.

Following task 92, in a task 94 controller 66 (FIG. 3) stores in its data base 70, the coordinates of the geographic and geopolitical boundaries that define the billing territory or territories under its jurisdiction as well as coordinates of their corresponding base point and corresponding common set of offsets. Controller 66 uses database 70 to identify a reference point 44 most closely proximate an actual ISU location 54 for each ISU 32 residing within its jurisdiction. Task 94 would normally be performed by controller 66 (FIG. 3) during activation of its GW 28 but could be performed or repeated when boundaries of its GW area 36 or billing territories 40 change, for whatever reason.

After task 94, controller 66 (FIG. 3) checks for ISUs 32 requesting registration in a monitoring task 96. ISUs typically request registration when being activated and when their actual location has changed more than a predefined mobility expansion allowance. As task 96 shows, when there are no ISUs 32 requesting registration processing loops back to task 96 and controller 66 continues to monitor for ISUs 32 requesting registration. When ISU 32 issues a registration request, controller 66 obtains coordinates for actual location 54 (FIG. 2) for that ISU. Controller 66 performs task 98 for each ISU 32 requesting registration in its GW area. As stated earlier, coordinates of actual location 54 (FIG. 2) may be determined by using GPS satellites or any of a variety of position location techniques.

Next, task 99 determines the billing territory 40 (FIG. 3) which encompasses the actual location 54. In task 100, controller 66 (FIG. 3) determines the reference point 44 within the billing territory determined in task 99 which is closest to actual location 54 (FIG. 2) of ISU 32. Task 100 then defines that reference point to be identified reference point 56. This task is completed for each registering subscriber unit residing in the jurisdiction of controller 66 (FIG. 3). Locating the reference point closest to the ISU actual location can be accomplished by any of a variety of means. One such means compares vector dot-products of various reference point offsets and the ISU actual location to identify the closest reference point.

Having defined identified reference point 56 (FIG. 2) for ISU 32 in task 100, controller 66 (FIG. 3) uses the offset of identified reference point 56 (FIG. 2) as a system location for that ISU in a task 102. Those skilled in the art will realize that the offset of identified reference point 56 will be an offset from the common set of offsets generated by the common translation algorithm referenced above. Task 102 is completed for each registering subscriber unit residing in the jurisdiction of controller 66 (FIG. 3).

After task 102, this ISU system location or offset is then stored as second data element 78 (FIG. 5) in VLR 72 (FIG. 3) of switching office 68 of corresponding GW area 36 in a task 104. For the embodiment shown in FIGS. 2 and 5, ring 84 and region ID 86 contain data representing the offset of identified reference point 56. A corresponding first data element 76 (FIG. 4) for this subscriber unit, identifies the GW area 36 (FIG. 3) and billing territory 40 of identified reference point 56 (FIG. 2) and is stored in the same VLR 72 (FIG. 3). Task 104 is completed for each registering subscriber unit residing in the jurisdiction of controller 66.

After task 104, controller 66 (FIG. 3) checks to determine if the registering subscriber unit is a new ISU that has entered its jurisdiction in a monitoring task 106. When the registering subscriber unit is a new ISU, that is registering for the first time in the jurisdiction of controller 66, controller 66 sends updated location information to that ISU's HLR in a task 107. After task 107, processing returns to monitoring task 96 where controller 66 waits or listens for registration requests from ISUs 32 within its jurisdiction. If the registering subscriber unit is not a new ISU, that is the ISU has previously registered in the jurisdiction of controller 66, processing is returned to monitoring task 96. Controller 66 (FIG. 3) continually checks its jurisdiction for ISUs requesting registration in task 96.

Figure 7:
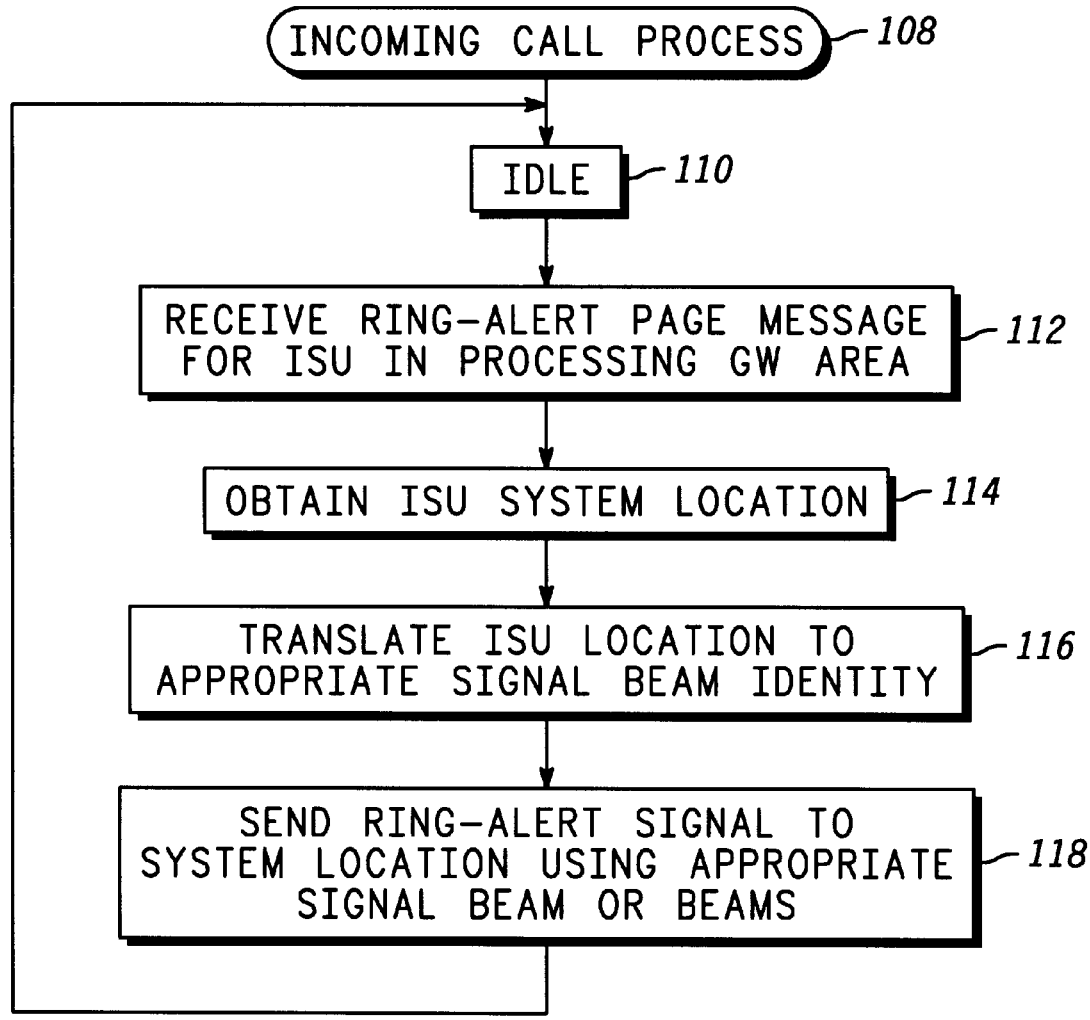
FIG. 7 shows a flowchart of an incoming call process for a GW area in accordance with a preferred embodiment of the present invention.

FIG. 7 shows a flow chart of an incoming call process 108 that is used by controller 66 (FIG. 3) of ring-alert system 62, when incoming calls are received. Process 108 is carried out in a like manner by each controller 66 (FIG. 3) of each GW area 36 of coverage area 20 (FIG. 1).

Process 108 starts with controller 66 in an idle mode 110, waiting for a ring-alert page message that needs to be directed to any of the registered ISUs 32 in its GW area 36 (FIG. 3). The ring-alert page message for ISU 32 in processing GW area 36 is received in a task 112. The incoming call could be received from any of a variety of telephonic devices, such as a conventional telephone connected to a conventional terrestrial based phone system or another ISU 32.

After receiving the ring-alert page message, controller 66 (FIG. 3), in a task 114, obtains a most recent system location for the requested ISU 32 by accessing VLR 72 of cellular switching office 68 (FIG. 3).

After task 114, a task 116 then translates the requested ISU system location into an appropriate signal beam identity for the cell 34 and signal beam 26 (FIG. 1) covering the region 48 where system 19 believes the called ISU 32 to be located. In a preferred embodiment, the process of translating the requested ISU system location into a regular region, expanding the region for mobility, and mapping the expanded region into an appropriate signal beam or beams is desirably performed using an ephemeris table for satellites 22 and the current time.

After task 116, controller 66 (FIG. 3) sends the ring-alert page message to the identified system location of ISU 32 (FIG. 3) using the appropriate signal beam or beams of task 116, in a task 118. Accordingly the present invention uses the high resolution system location for each ISU, as determined in FIG. 6, such that the area receiving the ring-alert page message is minimized and probability of contacting the requested ISU is maximized. The process then iterates as shown.

Although the method and apparatus of the present invention has been described herein as providing advantages for billing and ring-alert functions within wireless communication networks, the method and apparatus also could have benefits for other functions of a wireless communication network. For example, the method and apparatus of the present invention could be used for resource management and emergency location identification. Any function performed by a wireless communication system which would benefit from improved location determination capabilities could benefit from using the method and apparatus of the present invention.

In summary, the present invention provides a method that assigns the system location to each subscriber unit or ISU 32 (FIGS. 1, 2, 3 and 6) residing in wireless communication system coverage area 20 (FIG. 1) using plurality of reference points 44 (FIG. 2) to map coverage area 20 (FIG. 1) using a geographic independent scheme. This method minimizes database 70 of each GW area 36 (FIG. 3) while yielding high resolution system location data, for such system uses as sending ring-alert page messages to requested ISUs. In FIG. 2, the plurality of reference points used as the system location for ISUs 32 are located using regular sized overlay regions 48, creating common overlay map 53. In ring-alert system 62 (FIG. 3) a common translation algorithm is used, as referenced in FIG. 6 task 92, to locate the plurality of reference points used as the system location of ISUs 32.

Although the preferred embodiments of the invention have been illustrated and described in detail, it will be readily apparent to those skilled in the art that various modifications may be made therein without departing from the spirit of the invention or from the scope of the appended claims.

What is claimed is:

1. In a wireless communication system comprised of a plurality of satellite base stations moving with respect to earth's surface, each satellite base station providing a set of antenna beams, each antenna beam having a beam identity associated therewith, the wireless communication system having a coverage area which includes a plurality of billing territories, a method of sending ring alerts using an assigned system location to a subscriber unit residing in said coverage area, said method comprising the steps of:

defining a base point location for each billing territory of said plurality;

defining a plurality of reference point locations distributed within each billing territory;

storing each reference point location located within each billing territory as an angle and distance relative to the associated base point location for said each billing territory;

obtaining a GPS location for said subscriber unit from a global positioning satellite system;

identifying one of said reference point locations which is most proximate said GPS location, and storing said one reference point in a gateway associated with a billing territory within which the one reference point location is located, said one reference point location being said assigned system location for said subscriber unit;

in response to a ring-alert received for the subscriber unit, said gateway identifying one of said satellite base stations which is providing an antenna beam at said reference point location; and transferring the ring-alert to the identified satellite base station for subsequent transmission to the subscriber unit within said provided antenna beam.

2. A method as claimed in claim 1 wherein said providing the plurality of reference point locations step comprises the step generating a common set of offsets from said base point locations for each of said billing territories to locate each reference point location.

3. A method as claimed in claim 2 wherein each of said plurality of reference locations is associated with a regular sized overlay region, and said GPS location resides in one of said overlay regions which is associated with said identified reference point.

4. A method as claimed in claim 2 further comprising the step of defining a plurality of overlay regions within each billing territory, wherein one of said overly regions is centered at said base point and remaining ones of said overlay regions are arranged around said centered overlay region forming multiple rings of said overlay regions and being spacing outwardly to contain said billing territory, said reference point locations being located near a center of each of said overlay regions.

5. A method as claimed in claim 4 wherein:

said coverage area is substantially the surface of the earth.

6. A method as claimed in claim 5 wherein said reference point locations and said base point locations are fixed relative to the surface of the earth, and said method additionally comprises the steps of:

obtaining said system location for said subscriber unit when said ring-alert is received for said subscriber unit;

translating said obtained system location for said subscriber unit to a signal beam identity; and directing said ring-alert through one of said antenna beams having said signal beam identity.

7. A ring-alert system for servicing a wireless communication network to locate subscriber units in a coverage area of said wireless communication network, said wireless communication network comprised of a plurality of satellite base stations moving with respect to earth's surface, each satellite base station providing a set of antenna beams, each antenna beam having a beam identity associated therewith, the coverage area including a plurality of billing territories, said ring-alert system comprising:

a location register for storing a first data element associated with each subscriber unit, said first data elements recording identities of a base point location for each billing territory, the location register also storing a second data element associated with each subscriber unit, said second data element comprising a reference point location within one of said billing territories, wherein the reference point locations are defined as an angle and distance relative to the base point location of an associated billing territory; and a controller coupled to said location register, said controller being configured to translate actual locations for subscriber units into identities of said reference point locations and said base point locations to generate the first and second data elements, wherein said actual locations are provided from a global positioning satellite system, said controller causing the first and second data elements to be stored in the location register, and wherein in response to a ring-alert received for one of the subscriber units, the controller identifies one of the satellite base stations and an associated antenna beam currently servicing the reference point location associated with the one subscriber unit, the controller causing the ring-alert to be transferred to said one satellite base station.

8. A ring-alert system as claimed in claim 7 wherein said controller is configured to define each of said reference point locations to be associated with a regular sized overlay region.

9. A ring-alert system as claimed in claim 7 wherein said coverage area is substantially the surface of the earth.

10. A ring-alert system as claimed in claim 9 wherein:

said reference point locations and said base locations are fixed relative to the surface of the earth; and said controller is further configured to obtain said reference point location for a called subscriber unit when an incoming call is placed to said called subscriber unit, translate said reference point location for said called subscriber unit to a signal beam identity, and direct said incoming call through one of said antenna beams that has said signal beam identity.

11. A satellite communication network having a coverage area that substantially encompasses the surface of the earth, said coverage area having a plurality of billing territories, wherein each billing territory is associated with a base point location, said system comprising:

a plurality of satellites residing in non-stationary orbits each satellite projecting antenna beams toward the earth from said satellites, wherein said antenna beams move relative to the earth's surface; and a location register storing a first data element associated with each of a plurality of subscriber units being serviced by said network, said first data comprising the identities of base point locations for said billing territories of said coverage area, said location register storing a second data element associated with each of said subscriber units with a reference point location, the reference point locations being distributed within each billing territory and defined by a distance and angle related to the base point location of the associated billing territory; and a controller coupled to said location register, said controller being configured to translate actual locations for subscriber units into one of said reference point locations, said actual locations being determined by a global positioning satellite system.

12. A satellite communication network as claimed in claim 11 wherein:

said reference point locations and said base point locations remain fixed relative to the surface of the earth; and said controller is further configured to obtain said reference point location and base point location for a called subscriber unit when an incoming call is placed to said called subscriber unit, translate said reference point location and base point location for said called subscriber unit to a signal beam identity, then direct said incoming call through one of said antenna beams having said signal beam identity.

* * * * *